US 6,571,457 B2

(12) United States Patent
Naritomi

(10) Patent No.: US 6,571,457 B2
(45) Date of Patent: Jun. 3, 2003

(54) CONTROL PANEL FOR ELECTRONIC EQUIPMENT AND METHOD OF PRODUCING THE SAME

(75) Inventor: Masanori Naritomi, Urayasu (JP)

(73) Assignee: Taisei Plas Co., Ltd., Tokyo (JP)

(*) Notice: Subject to any disclaimer, the term of this patent is extended or adjusted under 35 U.S.C. 154(b) by 110 days.

(21) Appl. No.: 09/818,519

(22) Filed: Mar. 28, 2001

(65) Prior Publication Data

US 2001/0011786 A1 Aug. 9, 2001

Related U.S. Application Data

(62) Division of application No. 09/488,020, filed on Jan. 20, 2000, now abandoned.

(30) Foreign Application Priority Data

Jan. 22, 1999 (JP) ................................ 11-14240

(51) Int. Cl.⁷ .......................... B29C 45/14; H01H 13/70
(52) U.S. Cl. .......................... 29/622; 200/341; 200/5 A; 264/239; 428/137; 428/172
(58) Field of Search .................. 200/5 A, 512–517, 200/341; 24/622; 264/239–339, 138–163; 156/349, 528; 428/137, 172

(56) References Cited

U.S. PATENT DOCUMENTS

| 3,959,611 A | 5/1976 | Greene et al. ............. 200/5 A |
| 4,366,355 A | 12/1982 | Oelsch ................. 200/5 A X |
| 4,400,596 A | 8/1983 | Fukukura et al. ......... 200/5 A |
| 4,555,600 A | 11/1985 | Morse ................... 200/5 A |
| 4,980,522 A | 12/1990 | Murakami et al. ........ 200/5 A |
| 5,219,067 A | 6/1993 | Lima et al. ............. 200/302.2 |
| 5,274,217 A | 12/1993 | Kilian ................... 235/145 R |
| 5,367,133 A | 11/1994 | Schmidt et al. .......... 200/5 A |
| 5,461,376 A | 10/1995 | Oono et al. ............. 341/22 |
| 5,478,051 A * | 12/1995 | Mauer ................... 264/156 |
| 5,510,584 A | 4/1996 | Norris .................. 200/5 A |
| 5,528,235 A | 6/1996 | Lin et al. .............. 341/22 |
| 5,710,398 A | 1/1998 | Hassler et al. ........... 200/5 A |
| 6,023,033 A | 2/2000 | Yagi et al. ............. 200/512 |
| 6,180,896 B1 * | 1/2001 | Naritomi ................ 200/5 A |
| 6,383,604 B1 * | 5/2002 | Yoo et al. .............. 428/137 |

FOREIGN PATENT DOCUMENTS

| EP | 0 483 898 A | 5/1992 |
| EP | 0 616 345 A | 9/1994 |
| EP | 0 747 195 A | 12/1996 |
| EP | 0 859 388 A | 8/1998 |
| WO | WO 97 38842 A | 10/1997 |

* cited by examiner

Primary Examiner—J. R. Scott
(74) Attorney, Agent, or Firm—Armstrong, Westerman & Hattori, LLP

(57) ABSTRACT

A control panel for electronic equipment that satisfies the requirements of hermeticity, clearness of indication and operability and yet allows a cost reduction. A sheet made of a commercially available light-transmitting thermoplastic synthetic resin material is used as a substrate. Sheet recesses are formed on the sheet so that each print layer formed on the surface of the sheet is located on the inner side of the bottom of a sheet recess. The sheet recesses are filled with a synthetic resin material to form pushbuttons. A contact surface of a case cover and a contact surface of a pushbutton outer skin are kept in close contact with each other during injection molding. Therefore, there is no possibility of the resin material flowing between the contact surfaces. It is unnecessary to insert a mold member into the clearance between each pushbutton and the associated opening in the case cover. Because the clearance can be minimized, it becomes easy to achieve a size reduction and so forth. Design limitations are also reduced.

8 Claims, 8 Drawing Sheets

(a)

(b)

(c)

(d)

(a)

(b)

CONTROL PANEL FOR ELECTRONIC EQUIPMENT AND METHOD OF PRODUCING THE SAME

RELATED APPLICATIONS

This application is a division of U.S. application Ser. No. 09/488,3020 filed Jan. 20, 2000, now abandoned.

BACKGROUND OF THE INVENTION

1. Field of the Invention

The present invention relates to a control panel for electronic equipment and a method of producing the same. More particularly, the present invention relates to a control panel for electronic equipment that is made of a synthetic resin material by injection molding. The present invention also relates to a method of producing the control panel for electronic equipment.

2. Discussion of Related Art

With the recent spread of equipment related to computers and communications equipment, it has been demanded that data input units, e.g. control panels, for entering information into such equipment and receiving information therefrom should be reduced in cost to an extreme. On the other hand, the achievement of high-precision electronic parts demands hermeticity for providing a dustproof structure and for preventing breakdown of electronic parts due to static electricity. For example, control panels used in electronic equipment, e.g. portable telephones and personal computers, are required to accomplish ultimate cost reductions in order to allow these electronic devices to spread at reduced costs. Switching structures including printed-circuit boards are particularly demanded to be reduced in cost.

The present applicant proposed a control panel for electronic equipment (see Japanese Patent Application Unexamined Publication (KOKAI) No. 9-259696). In the proposed control panel, basically, a button body that is touched with a finger is made of a synthetic resin material, and a printed indication is usually provided on the surface of the button body. However, because the indication is frequently touched with a finger, it may separate from the button body by friction. To solve this problems, various methods have been proposed. However, none of the proposed methods use a sheet. Therefore, if such a proposed method is adopted, the number of man-hours increases. If the proposed method is employed for a low-cost key sheet, the number of man-hours increases. Accordingly, the merit in adopting the proposed method reduces by half.

To meet the demands, the present applicant proposed a technique wherein pushbuttons and a control panel are assembled by injection molding (for example, see Japanese Patent No. 2649025). In the proposed technique, the clearance between each pushbutton and an opening in the control panel in which the pushbutton is disposed unavoidably becomes large because of the structure of the injection mold used for the injection molding process. From the viewpoint of the structure and design of electronic equipment and from the viewpoint of preventing entry of a foreign matter, it is desirable for the clearance to be as small as possible as long as the pushbutton can perform its function.

SUMMARY OF THE INVENTION

In view of the above-described technical background, the present invention attains the following objects.

An object of the present invention is to provide a control panel for electronic equipment in which the clearance between each opening in the control panel and a pushbutton placed in the opening is reduced, and also provide a method of producing the control panel for electronic equipment.

Another object of the present invention is to provide a control panel for electronic equipment that satisfies the requirements of hermeticity, clearness of indication and operability and yet allows a cost reduction, and also provide a method of producing the control panel for electronic equipment.

Still another object of the present invention is to provide a control panel for electronic equipment that is superior in mass-productivity and a method of producing the control panel for electronic equipment.

To attain the above-described objects, the present invention provides a control panel for operating electronic equipment that includes a control panel member and a pushbutton inserted in an opening formed in the control panel member. A pushbutton support supports the pushbutton with respect to the control panel member by elastically bending. A pushbutton collar is formed around the outer periphery of the pushbutton. The control panel member and the pushbutton collar have contact portions, respectively, at which the pushbutton collar and the control panel member come in close contact with each other, and when the pushbutton is operated, the pushbutton support elastically bends, causing the pushbutton collar and the control panel member to come out of contact with each other.

The contact portion of the control panel member may be a step formed on the rear side of the control panel member to block a flow of a molten resin material in an injection mold when the pushbutton support is injection-molded. The contact portions are kept in close contact with each other by the pressure applied during the injection molding process. Therefore, no gap is produced between the contact portions, and thus the flow of the resin material is effectively blocked.

The arrangement may be such that the pushbutton and the pushbutton support are not joined together into one unit. In this case, the pushbutton is preferably coated with a non-welding agent that prevents thermowelding of the pushbutton and the pushbutton support.

In addition, the present invention provides a first method of producing a control panel for electronic equipment. According to the first method, a sheet is formed to produce a plurality of recesses thereon by thermoforming. The recesses form pushbutton outer skins. The sheet formed with the recesses is inserted into an injection mold, and a molten resin material is filled into the recesses to form a key sheet. A control panel member for inserting the key sheet therein and the key sheet are inserted into an injection mold, and a molten synthetic resin material is injected into a cavity defined by the key sheet, the control panel member and the injection mold to fill the cavity with the molten synthetic resin material, thereby molding a pushbutton support.

As the sheet, a general-purpose sheet is preferable from the viewpoint of the cost, and a substantially transparent resin material is preferable. A synthetic resin material that welds to other synthetic resin materials is most suitable for use as the sheet.

In addition, the present invention provides a second method of producing a control panel for electronic equipment. According to the second method, a sheet is formed to produce a plurality of recesses thereon by thermoforming. The recesses form pushbutton outer skins. The sheet is cut into the pushbutton outer skins individually. A control panel member for inserting the pushbutton outer skins therein and the pushbutton outer skins are inserted into an injection mold, and a molten synthetic resin material is injected into a cavity defined by each of the pushbutton outer skins, the control panel member and the injection mold to fill the recess and the cavity with the molten synthetic resin material, thereby molding a pushbutton support.

In the first or second method of producing a control panel for electronic equipment according to the present invention, it is preferable that the control panel member and a pushbutton outer skin collar formed around the outer periphery of each of the pushbutton outer skins should have contact portions, respectively, at which the pushbutton outer skin collar and the surface of the control panel member contact each other to block a flow of the molten synthetic resin material.

In the first or second method of producing a control panel for electronic equipment according to the present invention, the sheet is preferably printed with an indication layer for each pushbutton before the step of thermoforming the sheet.

In addition, the present invention provides a third method of producing a control panel for electronic equipment. According to the third method, a plurality of pushbuttons connected to each other are molded, and the molded pushbuttons are cut off from each other. A control panel member and the pushbuttons are inserted into an injection mold, and a molten synthetic resin material is injected into a cavity defined by the pushbuttons, the control panel member and the injection mold to fill the cavity with the molten synthetic resin material, thereby molding a pushbutton support.

In the third method of producing a control panel for electronic equipment according to the present invention, it is preferable that the control panel member and a pushbutton collar formed around the outer periphery of each of the pushbuttons should have contact portions, respectively, at which the pushbutton collar and the surface of the control panel member contact each other to block a flow of the molten synthetic resin material. It is also preferable that the pushbuttons should be made of a transparent synthetic resin material, and that an indication layer for each of the pushbuttons should be printed on the rear side of the pushbutton in a state where the pushbuttons are connected together by runners molded when the pushbuttons are molded.

In the third method of producing a control panel for electronic equipment according to the present invention, the pushbuttons and the pushbutton support may not be joined together into one unit. In this case, the pushbuttons are preferably coated with a non-welding agent that prevents thermowelding of the pushbuttons and the pushbutton support during the injection molding process.

The above and other objects, features and advantages of the present invention will become more apparent from the following description of the preferred embodiments thereof, taken in conjunction with the accompanying drawings.

DESCRIPTION OF THE PREFERRED EMBODIMENTS

Figure 1:
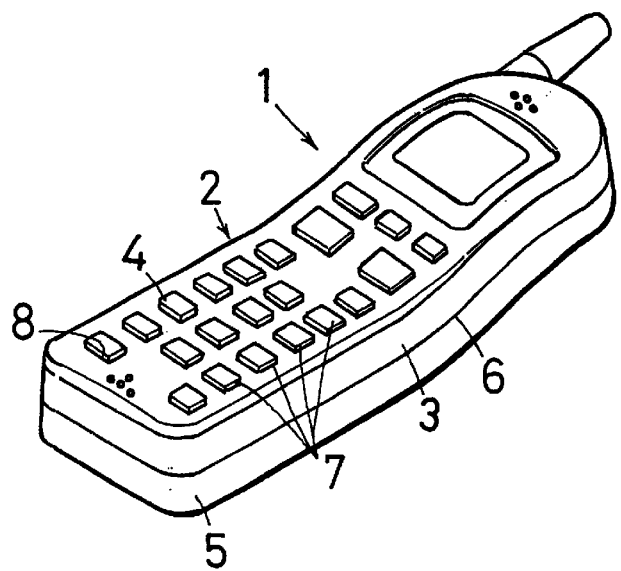
FIG. 1 is a perspective view of a portable telephone in which the present invention is used.

Embodiments of the present invention will be described below with reference to the accompanying drawings.
First Embodiment An example in which a control-panel for electronic equipment according to the present invention is used in a portable telephone will be described below. FIG. 1 is a perspective view of a portable telephone having a control panel according to the present invention. The portable telephone 1 has a telephone body 2 made of a synthetic resin material. The telephone body 2 contains electronic equipment, e.g. an IC, for realizing the function of a telephone.

Figure 2:
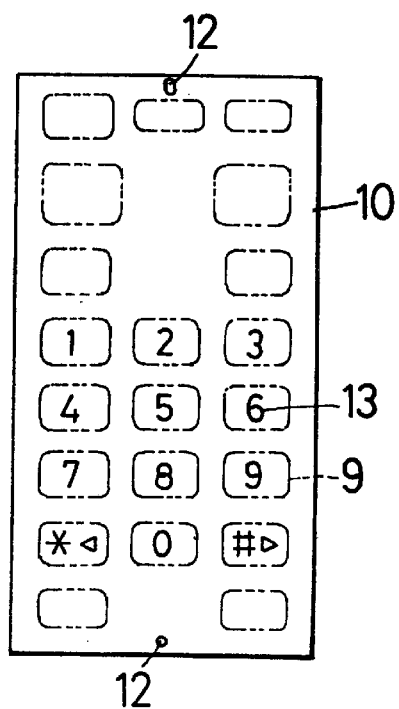
FIG. 2 is a plan view of a sheet serving as the outer skins of pushbuttons.

The telephone body 2 consists essentially of two parts, i.e. a case cover 3 and a back body member 5, which are divided from each other by a parting face 6 at the center thereof in the direction of the thickness. The case cover 3 is placed on the top of the telephone body 2. The back body member 5 is provided on the back of the telephone body 2. The case cover 3 performs the function of a control panel and also serves as a part of the telephone body 2. The case cover 3 has a plurality of pushbuttons 4 arranged thereon to constitute a group of keys 7. The case cover 3 and the back body member 5 are secured together into one unit by using screws, notches or other securing devices.
Printing of Indications Pushbuttons 4 (described later) are provided in the case cover 3. The method of producing the pushbuttons 4 will be described below in detail. A uniform sheet 10 as shown in the plan view of FIG. 2 is used as the outer skins of the pushbuttons 4. The sheet 10 is a thin film of a thermoplastic synthetic resin material that is transparent or semitransparent, i.e. which has light-transmitting properties, e.g. a polyester film, and cut into a rectangular shape. For example, the sheet 10 is formed from a single layer with a thickness of the order of from 0.25 mm to 0.8 mm. The sheet 10 has high tensile strength and is unlikely to tear easily. The sheet 10 is mass-produced by many manufacturers and commercially available at low cost. Therefore, the use of the sheet 10 is advantageous from the viewpoint of cost.

A plurality of indications 13, e.g. numerals, letters and symbols, are provided on the surface of the sheet 10. The indications 13 are printed on the sheet 10 from the rear side thereof as print layers 11. As shown in part (a) of FIG. 3, the sheet 10 is placed so that each print layer 11 on the sheet 10 faces upward (as viewed in the figure). In this state, a necessary indication 13 is printed on the rear side of a finger touch portion 9 to complete the print layer 11. It should be noted, however, that the print layers 11 may be formed by printing a ground color on the whole surface of the sheet 10 except indications 13, e.g. numerals, letters and symbols, so that the indications 13 are reversed out. Because the sheet 10 is made of a transparent material, the indications 13 can be displayed in the color of the synthetic resin material from the rear side of the sheet 10.

Printing of the print layers 11 is carried out by a known printing process, e.g. silk screen printing. Because the sheet 10 is flat, printing on the surface of the sheet 10 can be performed easily without the need of a special device. The sheet 10 has positioning holes 12 provided in the upper and lower ends thereof. To use portions of the sheet 10 that correspond to the print layers 11 as a group of keys, these portions are formed in the shape of protuberances by thermoforming (described later) so as to form finger touch portions 9 when the rear sides of the print layers 11 are formed as pushbuttons 4.

Thermoforming of Sheet

Figure 3:
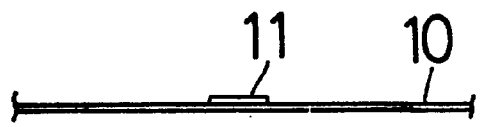
FIG. 3 is a diagram illustrating a process of thermoforming recesses on the sheet that form the reverse sides of protuberances.
Figure 3:
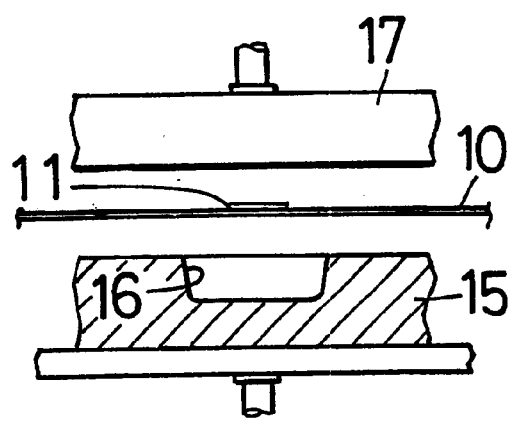
Figure 3:
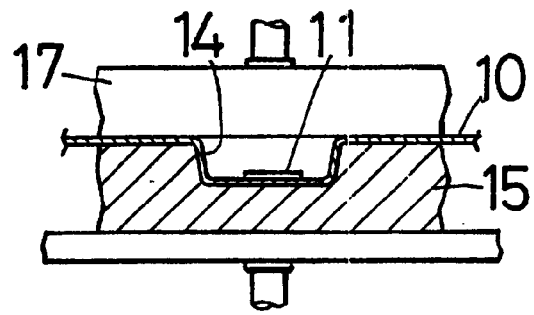
Figure 3:
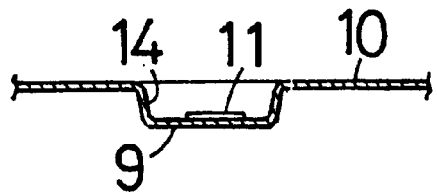

Next, the forming procedure carried out when the key sheet is formed by pressure forming will be described. Parts (a) to (d) of FIG. 3 are diagrams illustrating the process sequence of forming recesses on the sheet 10 that form the rear sides of protuberances formed as the finger touch portions 9. The printed sheet 10 is placed over a mold 15 so that the print layers 11 on the sheet 10 face upward. As shown in part (b) of FIG. 3, the sheet 10 is placed over the mold 15 such that a thermoforming recess 16 formed in the mold 15 lies directly below each print layer 11 on the sheet 10. A heating plate 17 having a flat mating surface is placed directly above the mold 15.

As shown in part (c) of FIG. 3, the sheet 10 is placed on the upper side of the mold 15 by engaging positioning pins (not shown) in the positioning holes 12 of the sheet 10 so that the print layers 11 of the sheet 10 correspond respectively to the thermoforming recesses 16 of the mold 15. Then, the heating plate 17 is pressed against the upper side of the sheet 10 to soften the sheet 10 by heating.

Compressed air not higher than 0.1 MPa is supplied to the upper side of the softened sheet 10 from the heating plate 17 side, and while doing so, the air in the thermoforming recesses 16 is evacuated from the lower side of the mold 15 to suck the lower side of the sheet 10. By the suction and heating, a plurality of sheet recesses 14 corresponding respectively to the print layers 11 are formed. Thus, as shown in part (d) of FIG. 3, each print layer 11 of the sheet 10 is located on the inner side of the bottom of a sheet recess 14 (i.e. on the rear side of a protuberance), and the surface of the sheet recess 14 on the side opposite to the side on which the print layer 11 is located is formed as a finger touch portion 9 of a pushbutton 4.

It should be noted that the finger touch portion 9 is formed in any desired shape, e.g. a square, circular or oval shape, in conformity to the shape of the pushbutton 4. The thermoforming of the sheet 10 is not necessarily limited to pressure forming but may be vacuum forming in which a thermoplastic sheet is fixed on a mold and softened by heating with a heater, and the softened sheet is pressed against the mold by a vacuum, thereby forming the sheet into a desired shape. It is also possible to perform thermoforming using a heating plate 17 formed with protuberances.

Injection Molding of Key Interior

Figure 4:
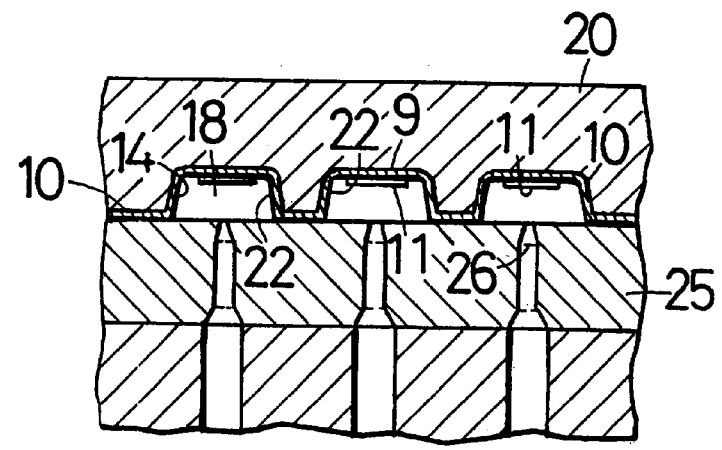
FIG. 4 is a sectional view showing a process of producing a key sheet.
Figure 4:
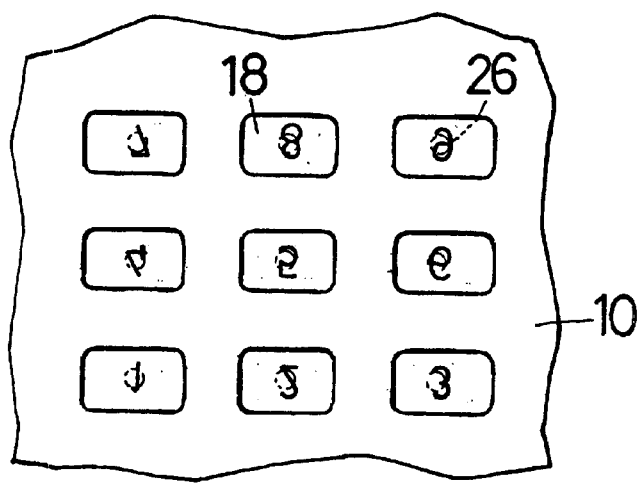
Figure 4:
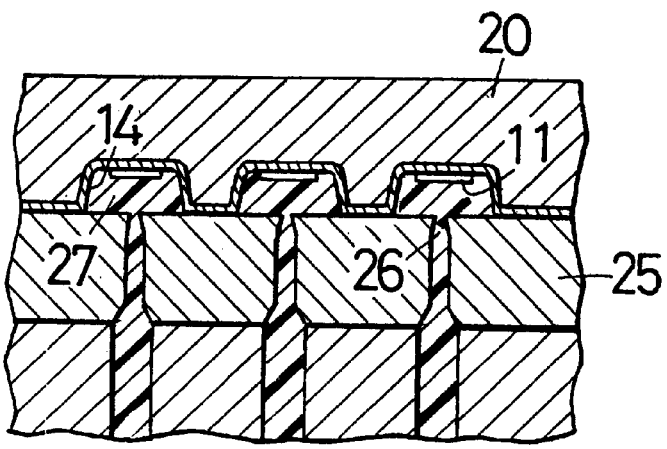

Parts (a) to (c) of FIG. 4 are diagrams illustrating a process in which each sheet recess 14 formed on the sheet 10 is filled with a resin material by injection molding. As shown in part (a) of FIG. 4, the finger touch portions 9 of the sheet 10 formed with a plurality of sheet recesses 14 are inserted into cavity recesses 22 formed in a cavity 18 of a movable retainer plate 20. The sheet 10 is placed on the movable retainer plate 20 with the finger touch portions 9 inserted in the cavity recesses 22, and in this state a stationary retainer plate 25 is pressed against the sheet 10. When the movable retainer plate 20 and the stationary retainer plate 25 are held together under pressure, gates 26 in the stationary retainer plate 25 communicate with the respective sheet recesses 14 of the sheet 10.

Part (b) of FIG. 4 shows the mating surface of the movable retainer plate 20. As shown in part (c) of FIG. 4, a molten resin material 27 is supplied into each sheet recess 14 of the sheet 10 through a gate 26. The molten resin material 27 is filled into the sheet recesses 14 so as to be flush with the surface of the sheet 10. Thus, a key sheet 24 having a group of protuberant keys 7 is completed. A desired synthetic resin material is selected according to the characteristics required for the pushbuttons, e.g. an engineering plastic material or a synthetic resin elastomer. As the material of the sheet 10 and the molten resin material 27 to be injected, it is preferable to use synthetic resin materials that thermoweld to each other.

Integration of Keys into Control Panel

Figure 5:
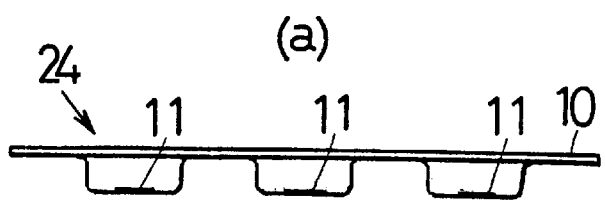
FIG. 5 is a sectional view showing a process of producing a control panel for electronic equipment according to a first embodiment of the present invention.
Figure 5:
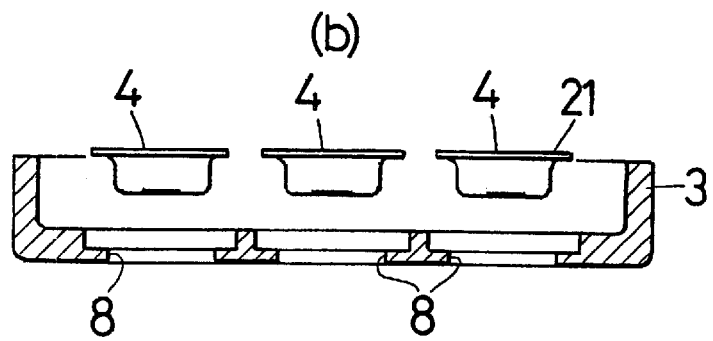
Figure 5:
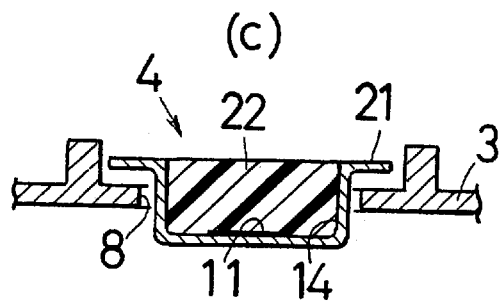
Figure 5:
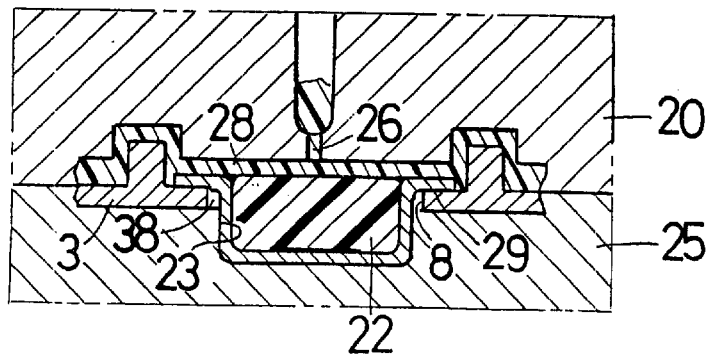

Next, a method of integrating the completed key sheet into the control panel will be shown. Parts (a) to (d) of FIG. 5 are sectional views showing a process of producing a control panel for electronic equipment according to the first embodiment. A key sheet 24 is produced by the above-described process [see part (a) of FIG. 5].

The pushbuttons 4 are cut off from the key sheet 24 so that each of the cut pushbuttons 4 has a pushbutton collar 21 with a predetermined width. The pushbutton collars 21 are used to engage the rear side of the case cover 3 after the pushbuttons 4 have been inserted into respective openings 8 formed in the case cover 3. Each pushbutton 4 is inserted into an opening 8 of the case cover 3 [part (c) of FIG. 5]. As shown in part (d) of FIG. 5, the pushbutton 4 temporarily fitted to the case cover 3 is inserted into a cavity 23 in a stationary retainer plate 25 of an injection mold. Thereafter, a molten thermoplastic elastomer is injected from a gate 26 to fill a hollow space defined by the cavity 23 and the pushbutton 4.

As the result of the injection of the molten resin material, a pushbutton support 28 melts the surface of the case cover 3 by the melt heat to thermoweld to it. Because the contact surfaces 29 of the case cover 3 and the pushbutton collar 21 are kept in close contact with each other, there is no possibility that the molten resin material injected to form the pushbutton support 28 may flow between the contact surfaces 29. It is unnecessary to insert a core or the like into a clearance 38 between the outer periphery of the pushbutton 4 and the opening 8 of the case cover 3. Accordingly, the clearance 38 can be minimized. This makes it easy to achieve a size reduction and so forth. Design limitations are also reduced. The minimal clearance 38 can effectively block entry of dust, water, etc.

Because the contact surfaces 29 are not thermowelded, when the pushbutton 4 is pushed, the pushbutton support 28 is elastically deformed, and only the contact surface 29 separates from the case cover 3 to move up and down. Thus, the pushbutton 4 performs its switching function. Although in the first embodiment the print layers 11 are printed on the sheet 10, the print layers 11 may be printed on the rear side of the key sheet 24 [i.e. the upper side thereof as viewed in part (a) of FIG. 5]. It should be noted, however, that the synthetic resin material filled in the cavity recesses 22 of the key sheet 24 must be substantially transparent.

Second Embodiment

Figure 6:
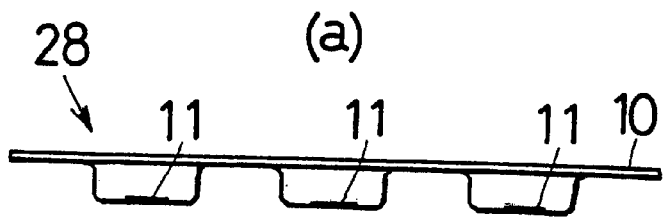
FIG. 6 is a sectional view showing a process of producing a control panel for electronic equipment according to a second embodiment of the present invention.
Figure 6:
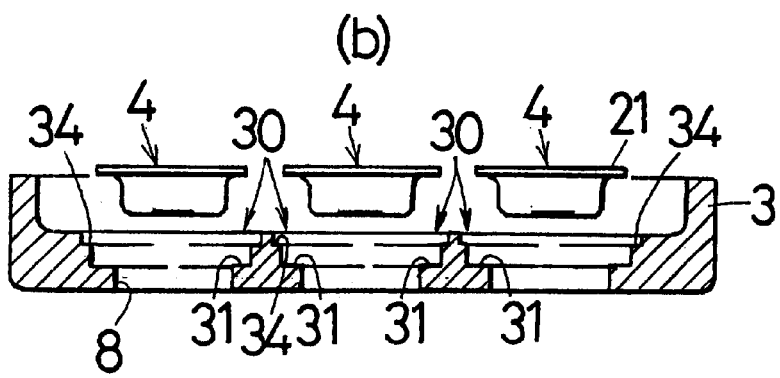
Figure 6:
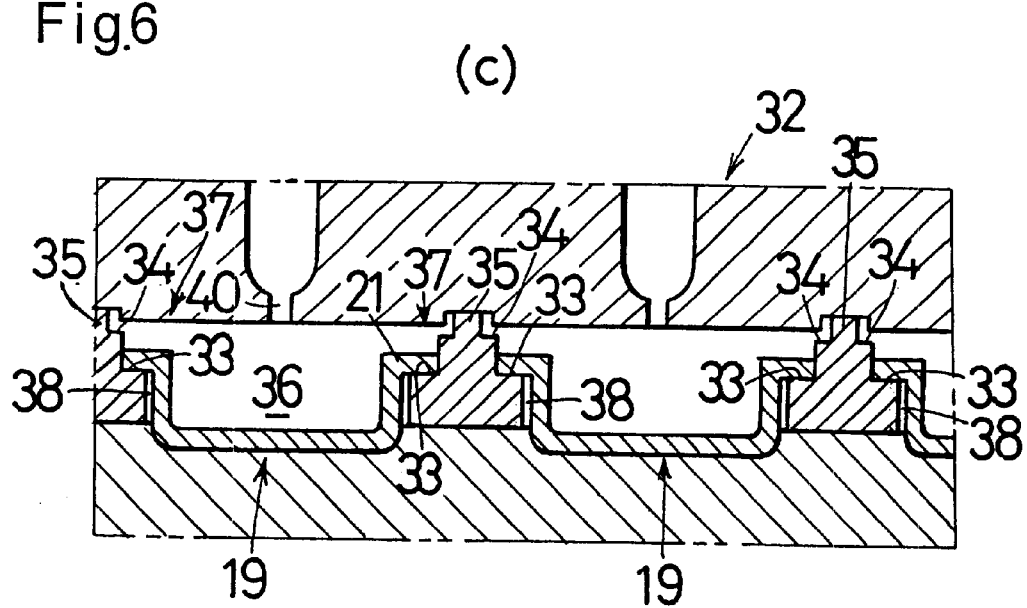

Although the interior of the above-described pushbutton 4 is made of a material different from that of the pushbutton support 28, it may be integrally molded with the pushbutton support 28 in an injection mold. Part (a) to (c) of FIG. 6 are diagrams showing the sequence of the integral molding process. The sheet 10 is cut to form a plurality of pushbutton outer skins 19.

The rear side of the case cover 3 is formed with pushbutton spaces 30 divided independently to place the pushbuttons 4, respectively. The pushbutton spaces 30 are each formed in the shape of a staircase with two steps, i.e. a pushbutton placing step 31 and a pushbutton support step 34. The pushbutton placing step 31, which is closer to the obverse side of the case cover 3, is provided for engagement with the pushbutton collar 21. First, the case cover 3 is inserted into an injection mold 32 (see FIG. 6).

After the case cover 3 has been inserted into the injection mold 32, the pushbutton collars 21 are fitted to the pushbutton placing steps 31, respectively. The pushbutton placing steps 31 of the case cover 3 and the pushbutton collars 21 are placed in close contact with each other at contact surfaces 33. A pushbutton support step 34 is formed at the outer periphery of each pushbutton placing step 31. At the outer periphery of each pushbutton support step 34, a rib 35 is provided so as to surround a pushbutton 4. Each rib 35 defines a pushbutton space 30.

A space surrounded by the injection mold 32, a pushbutton outer skin 19 and a rib 35 of the case cover 3 forms a cavity 36. Thereafter, a molten thermoplastic elastomer is injected into each cavity 36 from a gate 40 to fill the cavity 36. As the result of the injection, a pushbutton support 37 melts the surface of the case cover 3 by the melt heat and thermoweld to it. The contact surfaces 33 of the case cover 3 and the pushbutton outer skin 19 are kept in close contact with each other. Therefore, there is no possibility of the molten resin material flowing between the contact surfaces 33.

Accordingly, the contact surfaces 33 are not thermowelded. Because the flow of the resin material can be blocked by the contact surfaces 33 kept in close contact with each other, there is no possibility of the resin material flowing into the clearances 38 between the pushbutton outer skins 19 and the openings 8 of the case cover 3. Therefore, it is unnecessary to insert a core or the like into each clearance 38, and thus the clearance 38 can be minimized. Accordingly, it becomes easy to achieve a size reduction and so forth of the electronic equipment. Design limitations are also reduced. When a pushbutton 4 is pushed, the pushbutton support 37 is elastically deformed, and only the contact surface 33 separates from the case cover 3 to move up and down. Thus, the pushbutton 4 performs its switching function.

Third Embodiment

Figure 7:
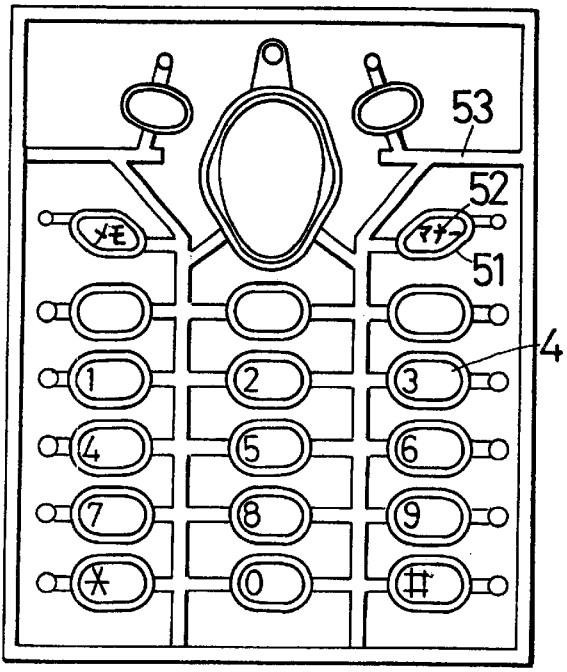
FIG. 7 is a diagram showing a process of producing a control panel for electronic equipment according to a third embodiment of the present invention.
Figure 7:
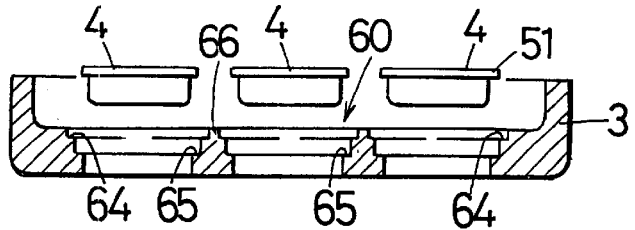
Figure 7:
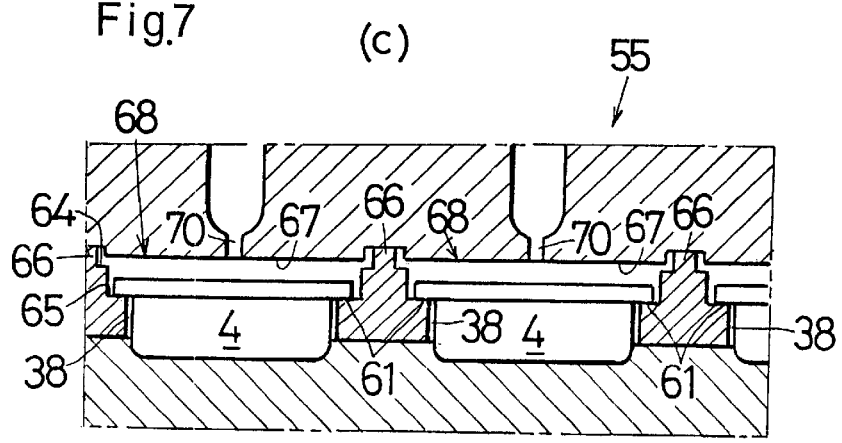

In the above-described embodiment, the pushbutton outer skins 19 are used. However, it is not always necessary to use the pushbutton outer skins 19. Parts (a) to (c) of FIG. 7 show the process of another production method. First, necessary pushbuttons 4 are simultaneously formed by injection molding. The pushbuttons 4 are molded by using a relatively rigid and transparent engineering synthetic resin material such as polycarbonate or acrylic resin material. In a state where the pushbuttons 4 are connected together by runners 53, the rear side of each pushbutton 4 is printed [see part (a) of FIG. 7]. Each pushbutton 4 has a pushbutton collar 51 integrally formed on the outer periphery thereof. The rear sides of the pushbuttons 4 as connected together by the runners 53 form a single plane.

The rear sides of the pushbuttons 4 are printed with indications 52 necessary for the pushbuttons 4, e.g. letters, symbols, or ground color. Because the synthetic resin material forming the pushbuttons 4 is transparent, the indications 52, e.g. letters, symbols, or ground color, printed on the rear sides of the pushbuttons 4 can be seen from the front side. Thereafter, the runners 53 are cut off to provide independent pushbuttons 4. The case cover 3 is inserted into an injection mold 55, and the pushbutton collars 51 are fitted to pushbutton placing steps 65, respectively.

The pushbutton collars 51 are placed in close contact with the pushbutton placing steps 65 of the case cover 3 at contact surfaces 61. Meanwhile, a pushbutton support step 64 is formed at the outer periphery of each pushbutton placing step 65. At the outer periphery of each pushbutton support step 64, a rib 66 is provided so as to surround the pushbutton 4. Each rib 66 defines a pushbutton space 60.

A space surrounded by the injection mold 55, a pushbutton 4 and a rib 66 of the case cover 3 forms a cavity 67. Thereafter, a molten thermoplastic elastomer is injected into each cavity 67 from a gate 70 to fill the cavity 67. As the result of the injection, a pushbutton support 68 melts the surface of the case cover 3 by the melt heat and thermoweld to it. The contact surfaces 61 of the case cover 3 and each pushbutton 4 are kept in close contact with each other. Therefore, there is no possibility of the molten resin material flowing between the contact surfaces 61. Accordingly, the contact surfaces 61 are not thermowelded.

As in the case of the foregoing embodiments, the contact surfaces 61 are not thermowelded. Because the flow of the resin material can be blocked by the contact surfaces 61 placed in close contact with each other, the clearances 38 between the outer peripheries of the pushbuttons 4 and the openings 8 of the case cover 3 can be minimized. It is also unnecessary to insert a core or the like into each clearance 38 to fill it, and thus the clearance 38 can be minimized. When a pushbutton 4 is pushed, the pushbutton support 68 is elastically deformed, and only the contact surface 61 separates from the case cover 3 to move up and down. Thus, the pushbutton 4 performs its switching function.

Fourth Embodiment

Figure 8:
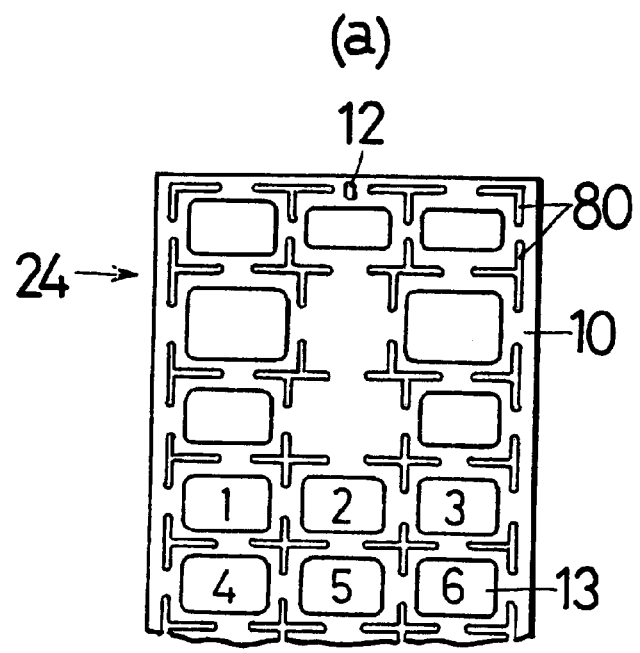
FIG. 8 is a diagram showing a process of producing a control panel for electronic equipment according to a fourth embodiment of-the present invention.
Figure 8:
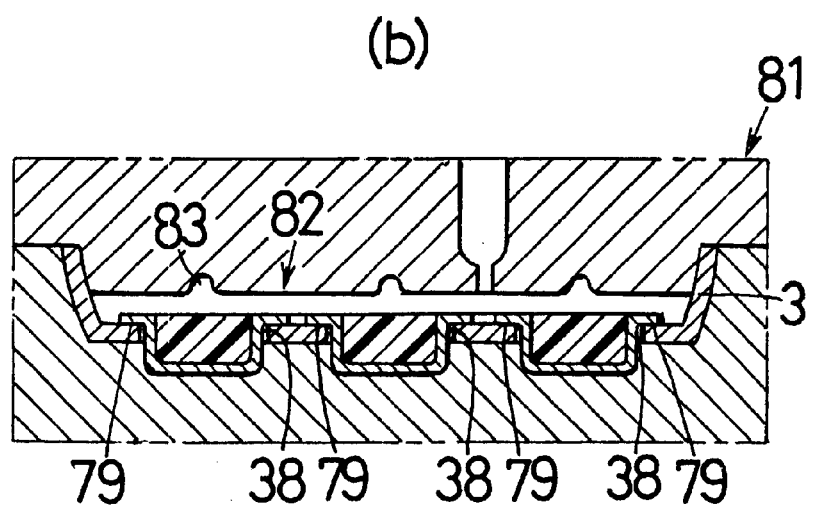

Parts (a) and (b) of FIG. 8 show a production process according to a fourth embodiment. Part (a) of FIG. 8 shows a key sheet 24 formed with slits 80. Part (b) of FIG. 8 is a sectional view showing the way in which injection molding is carried out with respect to the case cover 3 and the key sheet 24, which are inserted into an injection mold. First, slits 80 of desired shape are formed in the outer peripheral portion of the key sheet 24 formed from the sheet 10 by the above-described method and also in the portions between the keys of the key sheet 24 by punching, blanking or other similar method. The key sheet 24 formed with the slits 80 is inserted into an injection mold 81 together with the case cover 3.

Thereafter, the movable mold member is closed to form a pushbutton support 82 and switch-driving projections 83. When injected, a molten resin material flows through the slits 80 and is thermowelded to the base material of the case cover 3. However, because the contact surfaces 79 of the case cover 3 and the key sheet 24 are kept in close contact with each other, there is no possibility of the molten resin material flowing between the contact surfaces 79 as in the case of the foregoing embodiments. It is unnecessary to insert cores or the like into the clearances 38, and the clearances 38 can be minimized. Therefor, the contact surfaces 79 are not thermowelded. Accordingly, when a pushbutton 4 is pushed, the pushbutton support 82 is elastically deformed, and only the contact surface 79 separates from the case cover 3 to move up and down. Thus, the pushbutton 4 performs its switching function.

Fifth Embodiment

Figure 9:
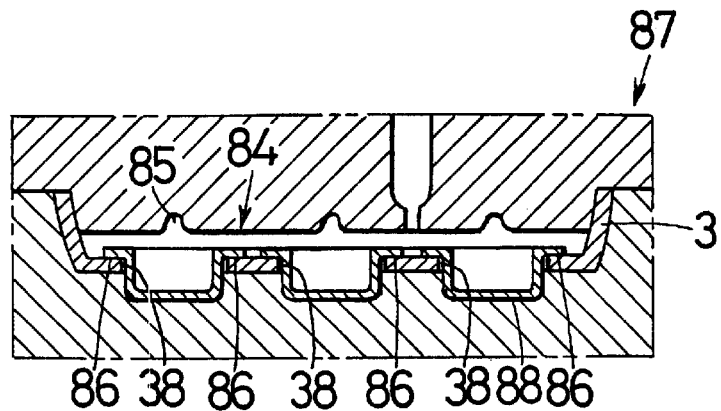
FIG. 9 is a sectional view showing a process of producing a control panel for electronic equipment according to a fifth embodiment of the present invention.

FIG. 9 shows a production process according to a fifth embodiment. The fifth embodiment is similar to the fourth embodiment in that the slits 80 are formed in the key sheet 24. In the fifth embodiment, after the sheet 10 has been printed, it is thermoformed to produce a formed sheet 88. The formed sheet 88 is inserted into an injection mold 87 together with the case cover 3. Thereafter, the movable mold member is closed to form a pushbutton support 84 and switch-driving projections 85.

When injected, a molten thermoplastic synthetic resin material flows through the slits 80 and is thermowelded to the base material of the case cover 3. However, because the-contact surfaces 86 of the case cover 3 and the key sheet 24 are kept in close contact with each other, there is no possibility of the molten resin material flowing between the contact surfaces 86 as in the case of the foregoing embodiments. It is unnecessary to place cores or the like in the clearances 38 to fill them, and the clearances 38 can be minimized. Because the clearances 38 are narrow, the molten resin material cannot reach the clearances 38. Therefore, the contact surfaces 86 are not thermowelded. Accordingly, in the fifth embodiment, the pushbuttons 4 and the pushbutton support 84 can be made of the same material.

Sixth Embodiment

In the foregoing embodiments, the pushbuttons, the case cover and the pushbutton support are integrally thermowelded in an injection mold or assembled together into one unit through a primer layer. However, when these components are assembled together into one unit, the play for the pushbuttons to move when pushed unavoidably becomes small. Accordingly, the pushbuttons are a little stiff to the touch in a pushbutton operation.

Figure 10:
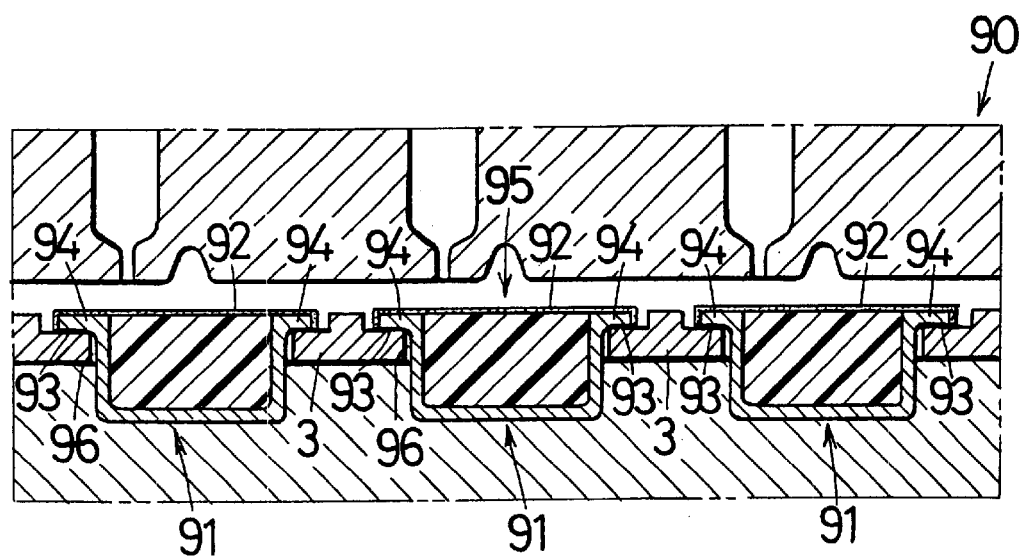
FIG. 10 is a sectional view of an injection mold for integrating a pushbutton support and a case cover with each other, showing a production process according to a sixth embodiment of the present invention.

The sixth embodiment is arranged so that the pushbutton operation is not stiff. FIG. 10 is a sectional view of an injection mold for integrating a pushbutton support and a case cover 3 with each other, which shows a production process according to the sixth embodiment.

FIG. 10 shows the case cover 3 and pushbuttons 91, which are inserted in the injection mold. The bottom surface of each pushbutton 91 and the outer peripheral surface of a pushbutton collar 94 thereof are coated with a non-welding agent 92. The non-welding agent 92 is used to prevent thermowelding of a pushbutton support 95 and the pushbuttons 91. Accordingly, the non-welding agent 92 may be any material that prevents thermowelding and that causes no extra component to separate out during the injection molding process. In other words, the non-welding agent 92 may be any material, e.g. synthetic resin materials or fats and oils, as long as the selected material does not thermoweld to either or both of the synthetic resin material forming the pushbuttons 91 and the synthetic resin material forming the pushbutton support 95.

After the case cover 3 and the pushbuttons 91 have been inserted into the injection mold 90, the movable mold member is closed to form a pushbutton support 95. When injected, a molten resin material for forming the pushbutton support 95 is thermowelded to the base material of the case cover 3. However, because the contact surfaces 93 of the case cover 3 and each pushbutton collar 94 are kept in close contact with each other, there is no possibility of the molten resin material flowing between the contact surfaces 93 as in the case of the foregoing embodiments. Accordingly, the contact surfaces 93 of each pushbutton collar 94 and the case cover 3 are not thermowelded.

It is also unnecessary to insert cores or the like to fill clearances 96 between the pushbuttons 91 and the openings of the case cover 3, and the clearances 96 can be minimized. Furthermore, the non-welding agent 92 prevents thermowelding of the pushbutton support 95 and the pushbuttons 91. Therefore, the pushbutton support 95 bends easily when a pushbutton 91 is pressed to perform a switching operation.

Accordingly, when a pushbutton 91 is pushed, the pushbutton support 95 is elastically deformed easily, and only the contact surface 93 separates from the case cover 3 to move up and down. Thus, the pushbutton 91 performs its switching function. It should be noted that the non-welding agent 92 may be similarly applied to the pushbuttons in the first and third embodiments described above as in the case of the sixth embodiment.

Other Embodiments

Although in the foregoing embodiments the case cover 3 and the pushbutton support 28, 37, 68, 82, 84 or 95 are thermowelded together into one unit, it should be noted that the present invention is not necessarily limited thereto but may also be applied to other members, e.g. control panels or frames, as long as they similarly perform the function of supporting pushbuttons. Therefore, these members are not distinguished from each other in the present invention. In the sense of providing the pushbuttons 4, the present invention is applicable to any member for mounting the pushbuttons 4.

It should be noted that in the first to fifth embodiments the pushbutton support 28, 37, 82 or 84 and the case cover 3 are thermowelded together in an injection mold. However, the process may be such that the case cover 3 is previously coated with a primer, e.g. a silicon primer, and the pushbutton support 28, 37, 82 or 84 and the case cover 3 are thermowelded with the primer interposed therebetween. When injection molding is carried out under conditions where the temperature of the molten resin material for injection molding is low, the pushbutton support 28, 37, 82 or 84 and the case cover 3 may be bonded together by an adhesive action in place of thermowelding.

In this case, an adhesive is applied to the case cover 3 in advance, and the pushbutton support 28, 37, 82 or 84 and the case cover 3 are bonded together. At this time, the pushbutton support 28, 37, 82 or 84 and the case cover 3 are bonded together mainly by an adhesive action, not by thermowelding.

Accordingly, the material of the case cover 3 is not necessarily limited to engineering plastic materials, but other materials may be used, for example, a magnesium alloy formed by injection molding, a metal sheet formed by plastic forming, and a die casting alloy formed by die casting.

As has been detailed above, the present invention allows a control panel exhibiting excellent hermeticity to be produced in a reduced number of process steps. Because the indication of each pushbutton is covered with the outer skin and positioned on the rear side, it is possible to prevent the indication from being stained or separated by the touch with a finger or the like. In addition, a collar is provided around the outer periphery of each pushbutton. During assembly by injection molding, the collars of the pushbuttons and the control panel, on which the pushbuttons are provided, are kept in contact with each other to block the flow of the molten resin material. Therefore, it is unnecessary to insert cores into the clearances between the pushbuttons and the openings in the control panel where the pushbuttons are disposed. Accordingly, the clearances can be minimized.

It should be noted that the present invention is not necessarily limited to the foregoing embodiments but can be modified in a variety of ways without departing from the gist of the present invention.

What is claimed is:

1. A method of producing a control panel for electronic equipment, said method comprising the steps of:

forming a sheet to produce a plurality of recesses thereon by thermoforming, said recesses forming pushbutton outer skins;

inserting said sheet formed with said recesses into an injection mold and filling a molten resin material into said recesses to form a key sheet;

inserting a control panel member for inserting said key sheet therein and said key sheet into an injection mold; and injecting a molten synthetic resin material into a cavity defined by said key sheet, said control panel member and said injection mold to fill said cavity with said molten synthetic resin material, thereby molding a pushbutton support.

2. A method of producing a control panel for electronic equipment, said method comprising the steps of:

forming a sheet to produce a plurality of recesses thereon by thermoforming, said recesses forming pushbutton outer skins;

cutting said sheet into said pushbutton outer skins individually;

inserting a control panel member for inserting said pushbutton outer skins therein and said pushbutton outer skins into an injection mold; and injecting a molten synthetic resin material into a cavity defined by each of said pushbutton outer skins, said control panel member and said injection mold to fill said recess and said cavity with said molten synthetic resin material, thereby molding a pushbutton support.

3. A method of producing a control panel for electronic equipment according to claim 1 or 2, wherein said control panel member and a pushbutton outer skin collar formed around an outer periphery of each of said pushbutton outer skins have contact portions, respectively, at which said pushbutton outer skin collar and a surface of said control panel member contact each other to block a flow of said molten synthetic resin material.

4. A method of producing a control panel for electronic equipment according to claim 1 or 2, wherein said sheet is printed with an indication layer for each pushbutton before said step of thermoforming said sheet.

5. A method of producing a control panel for electronic equipment, said method comprising the steps of:

molding a plurality of pushbuttons connected to each other;

cutting off said pushbuttons from each other;

inserting a control panel member for inserting said pushbuttons therein and said pushbuttons into an injection mold; and injecting a molten synthetic resin material into a cavity defined by said pushbuttons, said control panel member and said injection mold to fill said cavity with said molten synthetic resin material, thereby molding a pushbutton support.

6. A method of producing a control panel for electronic equipment according to claim 5, wherein said control panel member and a pushbutton collar formed around an outer periphery of each of said pushbuttons have contact portions, respectively, at which said pushbutton collar and a surface of said control panel member contact each other to block a flow of said molten synthetic resin material.

7. A method of producing a control panel for electronic equipment according to claim 5 or 6, wherein said pushbuttons are made of a transparent synthetic resin material, and an indication layer for each of said pushbuttons is printed on a rear side of said pushbutton in a state where said pushbuttons are connected together by runners molded when said pushbuttons are molded.

8. A method of producing a control panel for electronic equipment according to claim 5 or 6, wherein said pushbuttons are coated with a non-welding agent that prevents thermowelding of said pushbuttons and said pushbutton support before said pushbutton support is injection-molded.

* * * * *